United States Patent
Shah et al.

(10) Patent No.: US 11,391,491 B2
(45) Date of Patent: Jul. 19, 2022

(54) LOW WATER CUT-OFF REMOTE MONITORING AND DIAGNOSING SYSTEM

(71) Applicant: FLUID HANDLING LLC., Morton Grove, IL (US)

(72) Inventors: Pratik Shah, Des Plaines, IL (US); Ronan Stephens, Chicago, IL (US); James J. Gu, Buffalo Grove, IL (US); Glen E. Huse, Green Oaks, IL (US); Jaroslaw Berezowski, Mount Prospect, IL (US)

(73) Assignee: FLUID HANDLING LLC, Morton Grove, IL (US)

( * ) Notice: Subject to any disclaimer, the term of this patent is extended or adjusted under 35 U.S.C. 154(b) by 52 days.

(21) Appl. No.: 15/630,050

(22) Filed: Jun. 22, 2017

(65) Prior Publication Data

US 2017/0370616 A1 Dec. 28, 2017

Related U.S. Application Data

(60) Provisional application No. 62/353,284, filed on Jun. 22, 2016.

(51) Int. Cl.
*F24H 9/20* (2022.01)
*G05B 15/02* (2006.01)
*G01F 23/80* (2022.01)

(52) U.S. Cl.
CPC ........... *F24H 9/2007* (2013.01); *G01F 23/80* (2022.01); *G01F 23/802* (2022.01); *G05B 15/02* (2013.01)

(58) Field of Classification Search
CPC .... F24H 9/2007; G01F 23/0061; G05B 15/02
USPC .................................................... 340/640
See application file for complete search history.

(56) References Cited

U.S. PATENT DOCUMENTS

| | | | |
|---|---|---|---|
| 6,536,678 B2 | 3/2003 | Pouchak | |
| 7,409,301 B2 | 5/2008 | Tynkov | |
| 7,992,527 B2 | 8/2011 | Merwin | |
| 8,108,075 B2 | 1/2012 | Bohan, Jr. | |

(Continued)

FOREIGN PATENT DOCUMENTS

| | | |
|---|---|---|
| CN | 101369152 A | 2/2009 |
| CN | 101509657 A | 8/2009 |

(Continued)

OTHER PUBLICATIONS

"Boiler Sector Embraces Modulation and Wireless Connectivity," the News, achrnews.com, Feb. 23, 2015. http://www.achrnews.com/articles/128931-boiler-sector-embraces-modulation-and-wireless-connectivity.

(Continued)

*Primary Examiner* — Jack K Wang
(74) *Attorney, Agent, or Firm* — Ware, Fressola, Maguire & Barber LLP

(57) ABSTRACT

A LWCO remote monitoring and diagnosing system or device features a signal processor configured to: receive signaling containing information for running a remote low water cut off (LWCO) mobile application, and also containing information about historical data related to a LWCO circuit that monitors and controls a burner of a boiler that opens and closes to provide water to the boiler depending on the water level in the boiler; and determine corresponding signaling containing information about the historical data requested based upon the signaling received.

18 Claims, 3 Drawing Sheets

New generation LWCO remote monitoring and diagnosing system

(56) References Cited

U.S. PATENT DOCUMENTS

| | | | |
|---|---|---|---|
| 8,417,482 B2 | 4/2013 | Bohan et al. | |
| 2004/0181349 A1* | 9/2004 | Tynkov | F22B 35/18 |
| | | | 702/55 |
| 2009/0320501 A1* | 12/2009 | Morimoto | F25C 1/12 |
| | | | 62/340 |
| 2010/0045470 A1 | 2/2010 | Araiza et al. | |
| 2010/0232877 A1 | 9/2010 | Sanvik et al. | |
| 2010/0280665 A1 | 11/2010 | Fildes et al. | |
| 2014/0107939 A1* | 4/2014 | Jaunakais | G16C 20/90 |
| | | | 702/22 |
| 2014/0216437 A1* | 8/2014 | Martian | E01H 1/08 |
| | | | 237/63 |
| 2014/0266755 A1 | 9/2014 | Arensmeier et al. | |
| 2015/0277463 A1 | 10/2015 | Hazzard et al. | |
| 2016/0076909 A1* | 3/2016 | Klicpera | G01F 15/0755 |
| | | | 73/198 |
| 2017/0023963 A1* | 1/2017 | Davis | G05F 1/66 |
| 2017/0082993 A1* | 3/2017 | Narain | G05B 15/02 |
| 2017/0185383 A1* | 6/2017 | Sarkar | G06F 8/30 |
| 2017/0238401 A1* | 8/2017 | Sadwick | H05B 45/10 |
| | | | 315/294 |

FOREIGN PATENT DOCUMENTS

| | | |
|---|---|---|
| CN | 101520171 A | 9/2009 |
| CN | 202032556 U | 11/2011 |
| CN | 203215651 U | 9/2013 |
| CN | 103335300 A | 10/2013 |
| CN | 203432638 U | 2/2014 |
| CN | 103955180 A | 7/2014 |
| CN | 203881374 U | 10/2014 |
| CN | 204593359 U | 8/2015 |
| CN | 105157006 A | 12/2015 |
| EP | 2924532 A2 | 9/2015 |
| GB | 2519986 A | 5/2015 |
| GB | 2527840 A | 1/2016 |
| WO | 2016086326 A1 | 6/2016 |

OTHER PUBLICATIONS

"Remote Boiler Controls & Diagnostics," Honeywell, ecc.emea.honeywell.com, Copyright 2004-2007, printed Jun. 30, 2016 http://web.archive.org/web/20101005040708/http://ecc.emea.honeywell.com/oem/combustion/residential_heating/boilers/remote_controls_diagnostics.htm.
"The App that Makes Your Boiler Smart," Ariston, ariston.com, May 15, 2015, printed Jun. 30, 2016. http://web.archive.org/web/20150515102428/http://www.ariston.com/it/ariston-net.
"Monitor up to 10 Boilers Remotely," Auto Flame, autoflame com, printed Jun. 30, 2016 http://www.autoflame.com/docs/Dti-Mk7.pdf.
English language Abstract of WO2016086326.
English language Abstract of CN101369152.
English language Abstract of CN101509657.
English language Abstract of CN101520171.
English language Abstract of CN103335300.
English language Abstract of CN103955180.
English language Abstract of CN105157006.
English language Abstract of CN202032556.
English language Abstract of 203215651.
English language Abstract of 203432638.
English language Abstract of 203881374.
English language Abstract of 204593359.

* cited by examiner

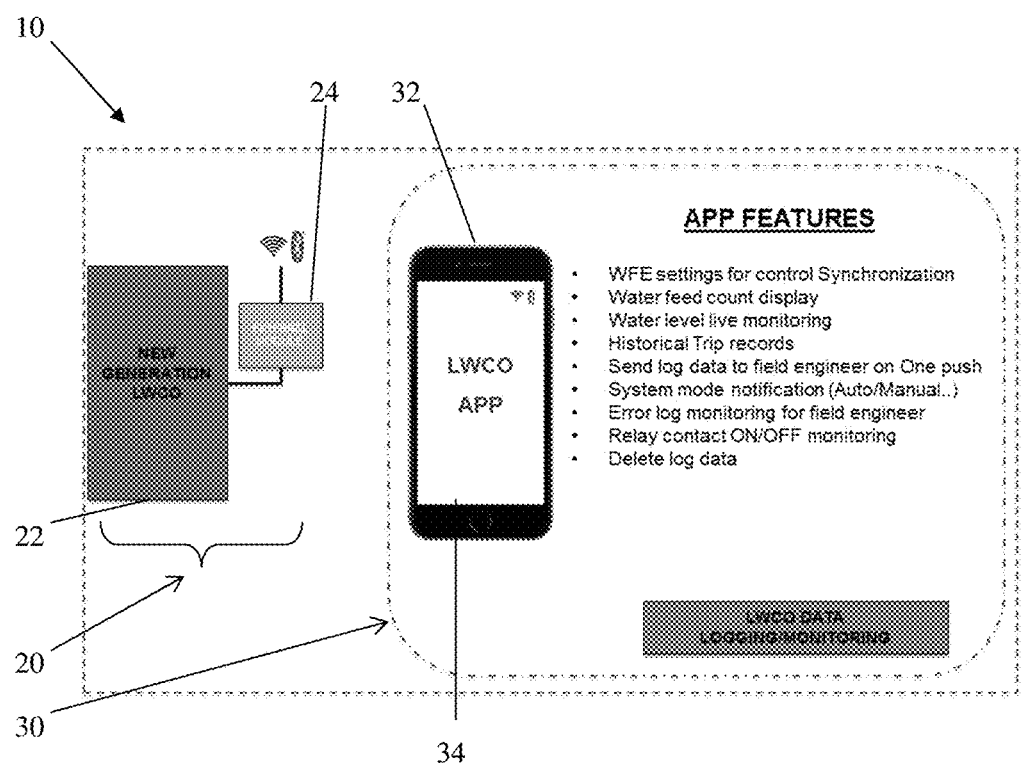
Figure 1: New generation LWCO remote monitoring and diagnosing system

LWCO app circuit/module 34

A signal processor or processing circuit/module 34a configured at least to:

receive signaling containing information for running a remote low water cut off (LWCO) mobile application, and also containing information about a user prompt requesting historical data related to a LWCO circuit that monitors and controls a burner of a boiler that opens and closes to allow to provide water to the boiler depending on the water level in the boiler;

determine corresponding signaling containing information the historical data requested based upon the signaling received, based upon the signaling received; and/or provide the corresponding signaling as control signaling to control the apparatus, e.g., including a burner or other hot water/liquid heating device.

Other signal processor circuits/components 34b that do not form part of the underlying invention, e.g., including input/output circuits/modules, one or more memory circuits/modules, data, address and control busing architecture, etc.

Figure 2

LOW WATER CUT-OFF REMOTE MONITORING AND DIAGNOSING SYSTEM

CROSS-REFERENCE TO RELATED APPLICATION

This application claims benefit to provisional patent application Ser. No. 62/353,284, filed 22 Jun. 2016, which is hereby incorporated by reference in its entirety.

This application also relates to U.S. Ser. No. 15/619,904, filed 12 Jun. 2017, which claims benefit to provisional patent application Ser. No. 62/348,271, filed 10 Jun. 2016, which are both hereby incorporated by reference in its entirety.

BACKGROUND OF THE INVENTION

1. Field of the Invention

The present invention relates to a monitoring system; and more particularly to a monitoring system for low water cut-off (LWCO), e.g., for a burner or other hot water/liquid heating device.

2. Brief Description of Related Art

Low water safety controls are used in the boiler industry to protect a boiler from a dry fire. These controls have single pole double throw (SPDT) contacts to operate the burner and alarm/water feeder. When the water level is normal, the circuit remains closed; and when the water level falls below the desired level, the circuit opens. When in an open state, the circuit connects to the water feeder/alarm, and when in a closed state the circuit connects to the burner. The opening and closing of the circuit depends on the mode of operation of the low water safety controls.

The LWCO circuit will open and close based on the water level. When the level of water falls below the desired level, the LWCO activates the relay open and supplies power to the water feeder contacts. Feeder activates and starts feeding water to the boiler for desired time set through a DIP switch. The water feeder DIP switch controls the feed cycles and the feed time. The LWCO and water feeder work independently, and this is a limitation of the current design/offering available.

The current LWCO provides information regarding the current circuit conditions based on the level of water. However, it does not show any historical records of the open and close state information of the circuit. Historical records help to understand the systems behavior and root causes in case of failures. By having information like trip records, feed record (of the last feed cycle compared to present one) the user/engineer can determine the behavior of the whole system. But this feature is not available in the existing design of LWCO.

Every field site where the LWCOs are installed could be different in nature compared to each other due to varying factors like size of boilers, quality of water, added chemical conductivity and pH factors. Some sites require in person engineering diagnosis during installation, maintenance or field failures which is a costly and time consuming activity. This is another limitation of the existing LWCO.

The current LWCO has different model numbers based on the application—Auto steam, Manual steam, Auto Hot water and Manual hot water. Each model can be identified by its respective part number. This is an easy but time consuming activity as one has to check the instruction manual to understand the correlation between the application type and required/installed model number. Also if these models are field configurable, one needs to check on the LWCO DIP switch settings to know the model configuration.

For different LWCO models, the existing LWCOs have fixed parameters like sensitivity, Delay on Make (DOM) and delay on break (DOB). However to know each model parameter value, one has to look into the respective model instruction manual. Present LWCO doesn't have any medium by which user can refer quickly without referring instruction manual.

Limitations of the Current Design of LWCO

1. No synchronization between water feeder DIP switch settings and LWCO.
2. Unavailability of historical records to understand the performance of the system, e.g., including:
   A. The number of times the LWCO tripped;
   B. The amount of water fed in the last water feed cycle compared to the present one;
   C. The total, present and previous water feed count;
   D. The time difference between last water feed and present water feed; and
   E. An errors history.
3. An inability to monitor and diagnose LWCO behavior remotely.
4. Not possible in an easy and quick way to know the LWCO model number/type and parameters for installed units in field.
5. Inability to Live monitor the LWCO water level data.

SUMMARY OF THE INVENTION

In summary, the present invention provides a new and unique low water cutoff remote monitoring and diagnosing system or device for low water cut-off (LWCO), e.g., for a burner or other hot water/liquid heating device, which will overcome all of the issues and limitations mentioned above. In effect, it is a complete new concept and has added advantages compared to the previous and existing systems, e.g., including those set forth above.

By way of example, the new generation LWCO may consist of a combination of a LWCO, an external wireless module and a mobile based application, for which a detailed explanation and functionality of each module is provided below.

1. The new Generation LWCO: The new Generation LWCO has a provision to connect external wireless modules through available field port. This wireless module can be based on WiFi, Bluetooth or any compatible wireless medium accessible to both LWCO and smart phones. By way of example, the LWCO will communicate with external module over a serial communication. The LWCO will transfer data on request over the serial communication to the external wireless module.

2. The external wireless module: Wireless module can be based on WiFi, Bluetooth or any compatible wireless medium used by both smartphones and LWCO. It will communicate with the LWCO over a serial protocol and communicate with smartphones over WiFi, Bluetooth or any compatible wireless medium. It basically functions as a mediator that is used to convert wireless signals to a serial protocol.

This module may be an external module of the LWCO and will not have to be always installed in or to the LWCO. It will connect the LWCO with the mobile-based application (e.g., in the smartphone or smart device) and allow data transfer between the two systems.

3. The smartphone/Mobile Application: Customized LWCO Smartphone based application (e.g., using IOS, Android, etc.) will be used to monitor and diagnose the LWCO controls. Smartphones will be connected to the LWCO over compatible wireless medium. A Smartphone application based LWCO will have significant advantages over existing systems and will help to overcome the existing limitations.

Advantages of the New Generation LWCO Over the Existing LWCO

Advantages of the new generation LWCO over the existing LWCO may include one or more of the following:

A. Allows a user to synchronize water feeder settings with the LWCO through the mobile-based application. By synchronizing the water feeder settings with the LWCO, it can calculate the amount of water feed into the system, the total amount of water, the last feed and present feed to boilers.

B. Includes a water feed count display which displays the water count for total feed, last feed and present feed.

C. Records the time difference between the last water feed and the present water feed in case of continuous available power.

D. Gives digital live monitoring of the water level inside the boiler over smartphone application.

E. Records the LWCO trip and duration of every trip. Also displays the trip record on the mobile application on a single button press.

F. Monitors and diagnoses the LWCO behavior remotely over smartphone application.

G. Enables a user to obtain the LWCO model number/type and its associated parameter data on smartphone application.

H. Enables the transfer of boiler water data and its parameters to an engineer through a smartphone application for ease of diagnosing and resolving problems.

I. Can delete all the LWCO trip and error logs by pressing one button through the smartphone application.

The LWCO with its capability to be monitored through a smartphone based application and its option for flexible/portable data transfer makes the new generation LWCO unique in the industry, and an important contribution to the state of the art.

Specific Embodiments

By way of example, and according to some embodiments, the present invention may include, or take the form of, a new and unique LWCO app circuit/module featuring a signal processor or signal processing circuit/module configured to:
  receive signaling containing information for running a remote low water cut off (LWCO) mobile application, and also containing information about historical data related to a LWCO circuit that monitors and controls a burner of a boiler that opens and closes to provide water to the boiler depending on the water level in the boiler; and
  determine corresponding signaling containing information about the historical data requested, based upon the signaling received.

The apparatus may include, or take the form of, e.g., a LWCO remote monitoring and diagnosing system, e.g., which includes a smart device having the LWCO app circuit/module with the signal processor or signal processing circuit/module.

The low water cutoff switch controller may also include one or more of the following features:

The corresponding signaling may contain information about the performance of the LWCO circuit, including one or more of the following:
  A. The number of times the LWCO circuit tripped,
  B. The amount of water fed in the last water feed cycle compared to the present water feed cycle,
  C. Total, present and previous water feed counts,
  D. The time difference between the last water feed and the present water feed, and
  E. Error history historical data.

The signal processor or signal processing circuit/module may be configured to provide the corresponding signaling determined, including where the corresponding signaling determined is displayed on a display screen of a smart device.

The signal processor may be configured to receive synchronized data from the LWCO circuit and store the synchronized data in a LWCO database memory circuit/module, including a LWCO data logging monitoring module.

The signal processor may be configured to receive live monitoring data from the LWCO circuit and store the live monitoring data in a LWCO database memory circuit/module, including where the signal processor is configured to display the live monitoring data on a display screen.

The apparatus may include a LWCO monitoring system in combination with a smart mobile device. The LWCO monitoring system may include the LWCO circuit in combination with a wireless signaling communication module configured to provide LWCO wireless signaling containing information about the historical data related to the LWCO circuit that monitors and controls the burner of the boiler that opens and closes to provide water to the boiler depending on the water level in the boiler. The smart mobile device may include the signal processor in combination with a corresponding wireless signaling module configured to receive the LWCO wireless signaling provided.

The LWCO mobile app may include, or take the form of, a remote smart mobile device application, including for running on a smart phone or tablet, as well as desktop or laptop computer.

The signal processor or signal processing circuit/module is configured to log and monitor the historical data received.

The signal processor or signal processing circuit/module may be configured to receive user prompt signaling containing information about a user prompt requesting information about historical record data; and the corresponding signaling contains information about the historical record data requested by a user.

The corresponding signaling may include, or take the form of, control signaling for providing to the LWCO circuit in order to control the function thereof. By way of example, the control signaling may implement control functionality that includes, or takes the form of, providing suitable control signaling for turning the burner on/off, for adding water to the burner, for changing the amount of water fed to the burner, for stopping the adding of water to the burner, for changing trip conditions for adding water to the burner, for issuing a suitable audio or visual warning, for requesting further historical data, for running tests on the water, for adding chemicals to the water, for providing the historical data to another party, etc.

According to some embodiments, the present invention may include, or take the form of, a method comprising:
  receiving in a LWCO app circuit/module having a signal processor signaling containing information for running a remote low water cut off (LWCO) mobile application, and also containing information about historical data related to a LWCO circuit that monitors and controls a burner of a boiler that opens and closes to provide water to the boiler depending on the water level in the boiler; and determining in the LWCO app circuit/module having the signal processor corresponding signaling containing information about the historical data, based upon the signaling received.

The method may include one or more of the features set forth herein.

BRIEF DESCRIPTION OF THE DRAWING

The drawing includes the following Figures, not necessarily drawn to scale, including:

FIG. 1 shows a block diagram of apparatus, e.g., including a LWCO remote monitoring and diagnosing system, according to some embodiments of the present invention.

FIG. 2 shows a block diagram of a LWCO app circuit/module that may form part of the remote monitoring and diagnosing system shown in FIG. 1, according to some embodiments of the present invention.

In the Figures, similar parts are labeled with similar reference numerals. Moreover, not every part is labelled with a reference numeral and lead line in every Figure, so as to reduce clutter in the drawing.

DETAILED DESCRIPTION OF THE INVENTION

Figure 3:
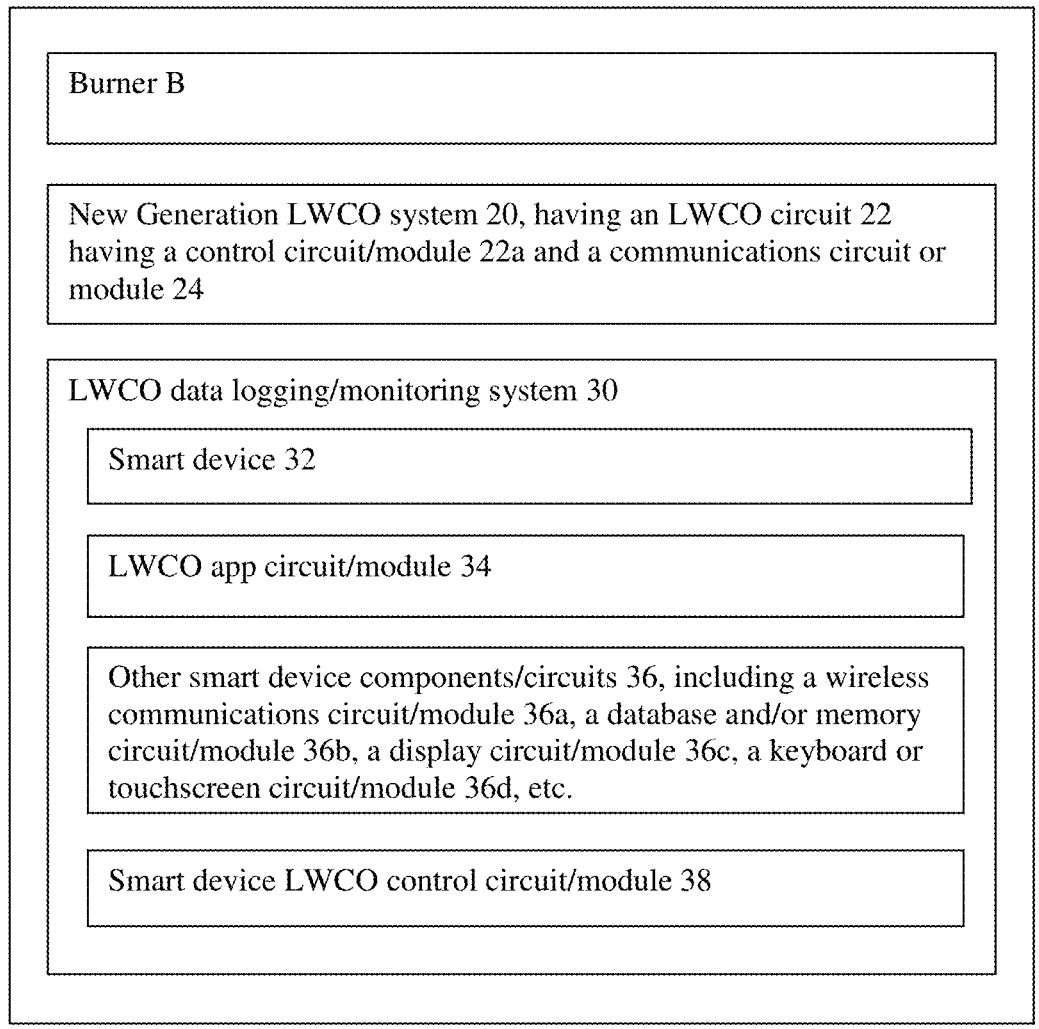
FIG. 3 shows a block diagram of a system having a burner in combination with the new generation LWCO system and the LWCO data logging/monitoring system shown in FIG. 1, according to some embodiments of the present invention.

By way of example, and consistent with that shown in FIGS. 1-3, the present invention features apparatus generally indicated as 10, e.g., including a new and unique LWCO remote monitoring and diagnosing system that may include a combination of a new generation LWCO system 20 and a LWCO data logging/monitoring system 30, which each run corresponding LWCO applications for cooperating with each other to implement the LWCO remote monitoring and diagnosing functionality set forth herein.

By way of example, and best shown in FIGS. 1 and 3, the new generation LWCO system 20 may include a new generation LWCO circuit 22 and an communication module 24, e.g., which may take the form of an external communications module as shown. By way of further example, and consistent with that shown in FIG. 1, the LWCO data logging/monitoring system 30 may include a smart device 32 having a LWCO app circuit/module 34. The LWCO circuit 22 and the LWCO app circuit/module 34 may be configured to each run the corresponding LWCO applications for cooperating with each other to implement the LWCO remote monitoring and diagnosing functionality set forth herein. By way of example, and consistent with that set forth below, the smart device 32 may be configured with a communications circuit/module for exchanging wireless signaling with the communication module 24 in order to implement the LWCO remote monitoring and diagnosing functionality set forth herein.

By way of example, and best shown in FIG. 2, the LWCO app circuit/module 34 may include a signal processor or signal processing circuit/module 34a configured to:

receive signaling containing information for running a remote low water cut off (LWCO) mobile application, and also containing information about historical data related to a LWCO circuit that monitors and controls a burner of a boiler that opens and closes to provide water to the boiler depending on the water level in the boiler; and determine corresponding signaling containing information about the historical data requested, based upon the signaling received.

By way of example, the signaling containing information for running the remote low water cut off (LWCO) mobile application may be stored in, and received from, a database and/or memory circuit/module like element 36b. By way of further example, the signaling containing information the historical data related to the LWCO circuit may also be stored in, and received from, the database and/or memory circuit/module like element 36b.

By way of example, the historical data may include one or more of the following:

A. The number of times the LWCO circuit tripped,
B. The amount of water fed in the last water feed cycle compared to the present water feed cycle,
C. Total, present and previous water feed counts,
D. The time difference between the last water feed and the present water feed, and
E. Error history historical data.

The signal processor or signal processing circuit/module 34a may be configured to process the historical data, and the corresponding signaling may contain information about the performance of the LWCO circuit 22, e.g., including providing the historical data received from the LWCO circuit 22 itself, or providing further information related to the historical data, e.g., based upon the further processing and diagnosing of the historical data. By way of example, the processing may include, or take the form of, putting the historical data in graph form, and the corresponding signaling may contain information for displaying one or more graphs related to the historical data. In effect, the corresponding signaling may include, or take the form of, display signaling, for the user to view on a display screen or module 36c (FIG. 3). In this case, the LWCO app circuit/module 34 may be configured to run an LWCO application for displaying data. As one skilled in the art would appreciate, applications for displaying data (e.g., on a smart phone, tablet, etc.) are known in the art, and the scope of the invention is not intended to be limited to any particular type or kind thereof either now known or later developed in the future.

The signal processor or processing circuit/module 34a may be configured to receive synchronized data from the LWCO circuit 22 and store the synchronized data in a LWCO database or memory circuit/module 36b, including a LWCO data logging monitoring circuit/module. In this case, the LWCO circuit 20 and the LWCO app circuit/module 34 may be configured to each run corresponding LWCO applications for synchronizing data; and the LWCO app circuit/module 34 may be configured to run a LWCO storage app for storing the synchronized data received in the LWCO database or memory circuit/module 36b. As one skilled in the art would appreciate, applications for synchronizing data are known in the art, and the scope of the invention is not intended to be limited to any particular type or kind thereof either now known or later developed in the future. As one skilled in the art would also appreciate, applications for storing data and/or synchronized data are known in the art, and the scope of the invention is not intended to be limited to any particular type or kind thereof either now known or later developed in the future.

The signal processor may be configured to receive live monitoring data from the LWCO circuit 22 and store the live monitoring data in the a LWCO database memory circuit/module 36a, including where the signal processor or signal processing circuit/module 34a is configured to display the live monitoring data on a display screen or module like element 36c for viewing by a user.

By way of example, the apparatus 10 may include, or take the form of, the LWCO remote monitoring and diagnosing system having the LWCO monitoring system 20 in combination with a smart mobile device like element 30. The LWCO monitoring system 20 may include the LWCO circuit 22 in combination with a wireless signaling communication module 24 configured to provide LWCO wireless signaling containing information about the historical data related to the LWCO circuit 22 that monitors and controls the burner of the boiler that opens and closes to provide water to the boiler B depending on the water level in the boiler.

The LWCO mobile app may include, or take the form of, a remote smart mobile device application, including for running on a smart phone, tablet, etc., as well as desktop or laptop computer. The smart device 32 may include other smart device components/circuits 36, e.g., including the wireless communications module 36a for implementing wireless communication functionality, the database and/or memory circuit/module 36b for implementing database and/or memory functionality, the display module 36c for implementing display functionality, the keyboard or touchscreen module 36d for implementing keyboard or touchscreen functionality, etc., which are all known in the art Various LWCO App(s)

As shown in FIG. 1, the LWCO app or application may include one or more modules for implementing one or more of the following features/functions:
  WFE settings for control synchronization;
  Water feed count display;
  Water level live monitoring;
  Historical trip records;
  Send log data to field engineer on one push;
  System mode notification (Auto/Manual);
  Error log monitoring for a field engineer;
  Relay contact ON/OFF monitoring; and
  Delete log data.

As one skilled in the art would appreciate, applications or apps for processing data signaling and providing corresponding signaling, on a smart device are known in the art. One skilled in the art would appreciate and understand how to implement the functionality of the signal processor or signal processing circuit module like element 34a without undue experimentation to adapt such known applications or apps in order to implement the aforementioned LWCO remote monitoring and diagnosing functionality, e.g., on a smart device, set forth above, including implementing functionality related to WFE settings for control synchronization, water feed count display, water level live monitoring, historical trip records, send log data to field engineer on one push, system mode notification (Auto/Manual), error log monitoring for a field engineer, relay contact ON/OFF monitoring, and delete log data. Moreover, the scope of the invention is not intended to be limited to, any particular type or kind of applications or apps for processing data signaling and providing corresponding signaling in order to implement the aforementioned LWCO remote monitoring and diagnosing functionality, on a smart device, set forth above.

User Prompts

By way of example, the signal processor or signal processing circuit/module 34a may be configured to receive signaling in the form of user prompt signaling containing information about a user prompt requesting information about the historical data. By way of example, the user prompt may include a first type of user prompt requesting the historical data from the LWCO circuit 22, or may also include a second type of user prompt requesting the historical data from a LWCO database or memory circuit/module (see FIG. 2, element 34b) storing the historical data received from the LWCO circuit 22, or may also include a third type of user prompt requesting the sending of control signaling to the LWCO circuit 22. By way of example, the user prompt signaling may be received from a keyboard or touchscreen module like element 36d.

The Signal Processor or Signal Processing Circuit/Module 34a

By way of example, the functionality of the signal processor or signal processing circuit-module 34a (FIG. 2) may be implemented using hardware, software, firmware, or a combination thereof. In a typical software implementation, the signal processor or signal processing circuit module 34a would include one or more microprocessor-based architectures having, e.g., at least one signal processor or microprocessor. A person skilled in the art would be able to program such a microcontroller (or microprocessor)-based implementation to perform the functionality described herein without undue experimentation. The scope of the invention is not intended to be limited to any particular implementation using technology either now known or later developed in the future. The scope of the invention is intended to include implementing the functionality of the signal processor or signal processing circuit module 34a as stand-alone processor or processor module, as separate processor or processor modules, as well as some combination thereof.

By way of example, one skilled in the art would appreciate and understand how to implement the functionality of the signal processor or signal processing circuit module 34a without undue experimentation, e.g., to receive/respond to signaling containing information for running a remote low water cut off (LWCO) mobile application, and also containing information about a user prompt requesting historical data related to a LWCO circuit that monitors and controls a burner of a boiler that opens and closes to provide water to the boiler depending on the water level in the boiler; and determine corresponding signaling containing information about the historical data requested, based upon the signaling received.

As one skilled in the art would also appreciate and understand, the signal processor or signal processing circuit module 34a may also include other signal processor circuits or components, e.g. including random access memory (RAM) and/or read only memory (ROM), input/output devices and control, and data and address buses connecting the same, and/or at least one input processor and at least one output processor.

The LWCO Circuit 22

Consistent with that set forth above in relation to the signal processor or signal processing circuit/module 34a, the LWCO circuit 22 may be implement using hardware, software, firmware, or a combination thereof. In a typical software implementation, the LWCO circuit 22 would include one or more microprocessor-based architectures having, e.g., at least one signal processor or microprocessor. A person skilled in the art would be able to program such a microcontroller (or microprocessor)-based implementation to perform the functionality described herein without undue experimentation. The scope of the invention is not intended to be limited to any particular implementation using technology either now known or later developed in the future. The scope of the invention is intended to include implementing the functionality of the LWCO circuit 22 as standalone processor or processor module, as separate processor or processor modules, as well as some combination thereof. As one skilled in the art would also appreciate and understand, the LWCO circuit 22 may also include other signal processor circuits or components, e.g. including random access memory (RAM) and/or read only memory (ROM), input/output devices and control, and data and address buses connecting the same, and/or at least one input processor and at least one output processor.

The Communications Module 24

Communications modules like element 24 (FIG. 1) are known in the art, and the scope of the invention is not intended to be limited to any particular type or kind thereof, e.g., either now known or later developed in the future. The communications modules 24 may be implemented internally or externally (as shown) in relation to the LWCO circuit 22. The scope of the invention is not intended to be limited to any particular type or kind of implementation.

LWCO Control Functionality

According to some embodiments, the corresponding signaling may include, or take the form of, control signaling for providing to the LWCO circuit 22 in order to control the function thereof. By way of example, in addition to that set forth above, the control signaling may implement control functionality that includes, or takes the form of, providing suitable control signaling for turning the burner B on/off, for adding water to the burner, for changing the amount of water fed to the burner, for stopping the adding of water to the burner, for issuing a suitable audio or visual warning, for changing trip conditions for adding water to the burner, for stopping the adding of water to the burner, for requesting further historical data, for running tests on the water (e.g., including the quality, the level, the pH, etc.), for adding chemicals to the water, for providing the historical data to a another party, etc. By way of further example, the LWCO mobile application may include control apps for responding to user control prompts, and providing the suitable control signaling based upon the same, and consistent with that set forth herein. By way of example, the LWCO control functionality may be implemented in a smart device LWCO control circuit/module like element 38 (FIG. 3).

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

What we claim is:

1. A low water cut-off (LWCO) remote monitoring and diagnosing system, comprising:
    a LWCO app circuit/module having a signal processor configured to:
        receive signaling containing information for running a remote LWCO mobile application, and also containing information about boiler water feed DIP switch settings that control a feed cycle and a feed time of water provided to a boiler and a LWCO model number/type provided by a LWCO circuit that monitors and controls a burner of the boiler that opens and closes to provide the water to the boiler depending on the water level in the boiler; and
        determine corresponding signaling containing information to control remotely the LWCO circuit, based upon the signaling received.

2. A low water cut-off (LWCO) remote monitoring and diagnosing system according to claim 1, wherein the signaling also includes the following:
    A. The number of times the LWCO circuit tripped,
    B. The amount of water fed in the last water feed cycle compared to the present water feed cycle,
    C. Total, present and previous water feed counts,
    D. The time difference between the last water feed and the present water feed, and
    E. Error history historical data.

3. A low water cut-off (LWCO) remote monitoring and diagnosing system according to claim 1, wherein the signal processor or signal processing circuit/module is configured to display a water count for a total feed, last feed and present feed on a water feed count display screen of the LWCO remote monitoring and diagnosing system.

4. A low water cut-off (LWCO) remote monitoring and diagnosing system according to claim 1, wherein
    the signal processor is configured to receive user prompt signaling containing information about a user prompt requesting information about historical data; and
    the signal processor is configured to display the historical data on a display screen of the LWCO remote monitoring and diagnosing system requested by a user.

5. A low water cut-off (LWCO) remote monitoring and diagnosing system according to claim 1, wherein the signal processor is configured to store the boiler water feed DIP switch settings and the LWCO model number/type in a LWCO database memory circuit/module, including a LWCO data logging monitoring circuit/module.

6. A low water cut-off (LWCO) remote monitoring and diagnosing system according to claim 1, wherein the signal processor is configured to receive live monitoring data from the LWCO circuit and store the live monitoring data in a LWCO database memory circuit/module, including where the signal processor is configured to display the live monitoring data on a display screen of the LWCO remote monitoring and diagnosing system.

7. A low water cut-off (LWCO) remote monitoring and diagnosing system according to claim 1, wherein the LWCO remote monitoring and diagnosing system comprises:
    the LWCO circuit in combination with a wireless signaling communication module configured to provide LWCO wireless signaling containing information about the historical data related to the LWCO circuit that monitors and controls the burner of the boiler that opens and closes to provide water to the boiler depending on the water level in the boiler; and a smart mobile device having the signal processor in combination with a corresponding wireless signaling module configured to receive the LWCO wireless signaling provided and provide wireless control signaling to control remotely the LWCO circuit.

8. A low water cut-off (LWCO) remote monitoring and diagnosing system according to claim 6, wherein the LWCO mobile app is a remote smart mobile device application, including for running on a smart phone or tablet, as well as desktop or laptop computer.

9. A low water cut-off (LWCO) remote monitoring and diagnosing system according to claim 1, wherein the LWCO remote monitoring and diagnosing system includes, or takes the form of, a smart device with the LWCO app circuit/module for implementing LWCO remote monitoring and diagnosing.

10. A low water cut-off (LWCO) remote monitoring and diagnosing system according to claim 1, wherein the signal processor is configured to provide the corresponding signaling as the control signaling to the LWCO circuit in order to control remotely monitoring and controlling of the burner by the LWCO circuit.

11. A low water cut-off (LWCO) remote monitoring and diagnosing system according to claim 10, wherein the control signaling implements monitoring and controlling functionality that includes, or takes the form of, turning the burner on/off, adding water to the burner, changing the amount of water fed to the burner, stopping the adding of water to the burner, or changing trip conditions for adding water to the burner.

12. A low water cut-off (LWCO) remote monitoring and diagnosing system according to claim 1, wherein the control signaling implements monitoring and controlling functionality that includes, or takes the form of, turning the burner on/off, adding water to the burner, changing the amount of water fed to the burner, stopping the adding of water to the burner, or changing trip conditions for adding water to the burner.

13. A low water cut-off (LWCO) remote monitoring and diagnosing system according to claim 1, wherein the control signaling implements monitoring and controlling functionality that includes, or takes the form of, issuing a suitable audio or visual warning, requesting further historical data, running tests on the water in the burner, adding chemicals to the water in the burner, or providing the historical data to another party.

14. A low water cut-off (LWCO) remote monitoring and diagnosing system according to claim 1, wherein the signaling includes the LWCO model number/type and its associated parameter data.

15. A method for remotely monitoring and diagnosing a low water cut-off (LWCO) circuit, comprising:

receiving in a LWCO app circuit/module having a signal processor signaling containing information for running a remote LWCO mobile application, and also containing information about boiler water feed DIP switch settings that control a feed cycle and a feed time of water provided to a boiler and a LWCO model number/type provided by a LWCO circuit that monitors and controls a burner of the boiler that opens and closes to provide the water to the boiler depending on the water level in the boiler; and determining in the LWCO app circuit/module having the signal processor corresponding signaling containing information to control remotely the LWCO circuit, based upon the signaling received.

16. A method according to claim 15, wherein the method comprises providing from the signal processor the corresponding signaling as control signaling to the LWCO circuit in order to control remotely the function thereof.

17. A method according to claim 16, wherein the control signaling provided to the LWCO circuit implements monitoring and controlling functionality that includes, or takes the form of, turning the burner on/off, adding water to the burner, changing the amount of water fed to the burner, stopping the adding of water to the burner, or changing trip conditions for adding water to the burner.

18. A method according to claim 15, wherein the signaling also includes the following:

A. The number of times the LWCO circuit tripped,
B. The amount of water fed in the last water feed cycle compared to the present water feed cycle,
C. Total, present and previous water feed counts,
D. The time difference between the last water feed and the present water feed, and
E. Error history historical data.

* * * * *